United States Patent
Bhatt et al.

(10) Patent No.: US 12,026,357 B2
(45) Date of Patent: Jul. 2, 2024

(54) PERSONALIZING USER INTERFACE DISPLAYS IN REAL-TIME

(71) Applicant: Walmart Apollo, LLC, Bentonville, AR (US)

(72) Inventors: Priyanka Bhatt, Faridabad (IN); Anshika Singh, Ghaziabad (IN); Shankar Bhargava, Santa Clara, CA (US); Cole Warren Dutcher, Somerville, MA (US); Muzhou Liang, San Francisco, CA (US); Saurabh Kumar, Aurangabad (IN)

(73) Assignee: WALMART APOLLO, LLC, Bentonville, AR (US)

( * ) Notice: Subject to any disclaimer, the term of this patent is extended or adjusted under 35 U.S.C. 154(b) by 334 days.

(21) Appl. No.: 17/589,871

(22) Filed: Jan. 31, 2022

(65) Prior Publication Data

US 2022/0155926 A1    May 19, 2022

Related U.S. Application Data

(63) Continuation-in-part of application No. 16/682,070, filed on Nov. 13, 2019, now Pat. No. 11,687,802.

(51) Int. Cl.
| | | |
|---|---|---|
| *G06F 3/0484* | (2022.01) | |
| *G10L 15/18* | (2013.01) | |
| *G10L 15/22* | (2006.01) | |

(52) U.S. Cl.
CPC ............ *G06F 3/0484* (2013.01); *G10L 15/18* (2013.01); *G10L 15/22* (2013.01); *G10L 2015/223* (2013.01)

(58) Field of Classification Search
USPC ...................................................... 704/1–504
See application file for complete search history.

(56) References Cited

U.S. PATENT DOCUMENTS

| | | |
|---|---|---|
| 6,993,586 B2 | 1/2006 | Chen et al. |
| 8,435,167 B2 * | 5/2013 | Oohashi ............ G10H 7/00 600/27 |

(Continued)

FOREIGN PATENT DOCUMENTS

| | | | |
|---|---|---|---|
| EP | 1679093 A1 * | 7/2006 | ............ A61M 21/02 |
| EP | 1679093 B1 * | 9/2019 | ............ A61M 21/02 |

OTHER PUBLICATIONS

Poi, P., et al., "Predict Customer Contact Intent Using AI and Amazon Connect," accessed on Jan. 6, 2022 at https://aws.amazon.com/blogs/contact-center/predict-customer-contact-intent-using-ai-and-amazon-connect/ (15 pgs) Dec. 10, 2020.

(Continued)

*Primary Examiner* — Marcus T Riley
(74) *Attorney, Agent, or Firm* — BRYAN CAVE LEIGHTON PAISNER LLP

(57) ABSTRACT

A method implemented via execution of computing instructions configured to run at one or more processors and stored at one or more non-transitory computer-readable media. The method can include receiving, via a computer network, a user interaction signal from a user device for a user. The method further can include after receiving the user interaction signal, determining, in real-time via a machine learning model, a plurality of user intent labels based at least in part on transaction data, interaction data, and incident data for the user. The machine learning model can include pre-trained based on historical input data and historical output data associated with multiple users comprising the user. The historical input data can comprise historical feature embedding vectors for historical transaction data, historical interaction data, and historical incident data associated with the multiple users. The historical output data can include historical intent labels determined based at least in part on user-uttered intents by the multiple users in historical con- (Continued)

versation data, identified by natural language understanding. In some embodiments, the method also can include, after determining the plurality of user intent labels, determining, in real-time, one or more user intent candidates of the plurality of user intent labels based on a confidence threshold. In a few embodiments, the method further can include, after determining the one or more user intent candidates, determining, in real-time, one or more user interface components for the one or more user intent candidates. After determining the one or more user interface components, the method further can include transmitting, via the computer network, the one or more user interface components to be presented on a user interface executed on the user device for the user. Other embodiments are described.

20 Claims, 4 Drawing Sheets

(56) References Cited

U.S. PATENT DOCUMENTS

| | | | |
|---|---|---|---|
| 8,656,280 B2 * | 2/2014 | Morikawa | H04N 21/432 715/708 |
| 8,849,730 B2 | 9/2014 | Winn et al. | |
| 9,245,225 B2 | 1/2016 | Winn et al. | |
| 10,108,934 B2 | 10/2018 | Basu et al. | |
| 10,394,954 B2 | 8/2019 | Vainas et al. | |
| 10,474,954 B2 | 11/2019 | Kumar et al. | |
| 10,607,598 B1 | 3/2020 | Larson et al. | |
| 10,714,084 B2 | 7/2020 | Engles et al. | |
| 10,984,782 B2 * | 4/2021 | Finkelstein | G10L 17/08 |
| 11,321,362 B2 | 5/2022 | Iwata | |
| 2008/0071136 A1 * | 3/2008 | Oohashi | G10H 7/00 600/27 |
| 2010/0204540 A1 * | 8/2010 | Oohashi | G10H 7/00 600/27 |
| 2013/0159408 A1 | 6/2013 | Winn et al. | |
| 2018/0157638 A1 * | 6/2018 | Li | G06F 40/35 |
| 2018/0157958 A1 * | 6/2018 | Fourney | G06F 3/0237 |
| 2020/0097981 A1 | 3/2020 | Teo et al. | |
| 2021/0125025 A1 * | 4/2021 | Kuo | G06N 5/04 |
| 2021/0142189 A1 * | 5/2021 | Subramanya | G10L 15/22 |
| 2022/0155926 A1 * | 5/2022 | Bhatt | G06F 3/167 |

OTHER PUBLICATIONS

Pascual, F., "Everything You Should Know About Customer Service Automation," accessed on Jan. 6, 2022 at https://monkeylearn.com/blog/customer-service-automation/#dos-and-donts (18 pages) Aug. 28, 2019.

Qu, et al., "User Intent Prediction in Information-Seeking Conversations," Association for Computing Machinery, 2019 2019.

Sun, et al., "Collaborative Intent Prediction with Real-Time Contextual Data," ACM Transactions on Information Systems, 2017 2017.

Luukkonen, et al., "LSTM-Based Predictions for Proactive Information Retrieval," 2016 2016.

Zhang, et al., "Collaborative Filtering for Recommender Systems," IEEE, 2014 2014.

Devlin, et al., "BERT: Pre-Training of Deep Bidirectional Transformers for Language Understanding," 2018 2018.

* cited by examiner

400

410 Receiving, via a computer network, a user interaction signal from a user device for a user 420 Determining, in real-time via a machine learning model, a plurality of user intent labels based at least in part on transaction data, interaction data, and incident data for the user 430 Determining, in real-time, one or more user intent candidates of the plurality of user intent labels based on a confidence threshold 440 Determining, in real-time, one or more user interface components for the one or more user intent candidates 450 Transmitting, via the computer network, the one or more user interface components to be presented on a user interface executed on the user device for the user

FIG. 4

PERSONALIZING USER INTERFACE DISPLAYS IN REAL-TIME

CROSS-REFERENCE TO RELATED APPLICATIONS

This application is a continuation-in-part of, and claims priority to and the benefit of, U.S. patent application Ser. No. 16/682,070, filed Nov. 13, 2019. U.S. patent application Ser. No. 16/682,070 is incorporated herein by reference in its entirety.

TECHNICAL FIELD

This disclosure relates generally to personalizing user interface displays in real-time.

BACKGROUND

Existing customer care techniques generally predict user intent after a user utters the intention and/or provides instructions and change the options on the following user interface displays or menus accordingly. However, systems using such customer care techniques cannot produce a satisfying user experience when a user has recently ordered goods from a seller and/or contacted the customer care team for an issue with the order(s), and the user still has to go through the same user interface display(s) or menus before getting to the relevant options or answers. Therefore, systems and/or methods that can predict the user intent and personalize the user interface displays accordingly, even before the user sees or hears the first menu, are desired.

BRIEF DESCRIPTION OF THE DRAWINGS

To facilitate further description of the embodiments, the following drawings are provided in which:

FIG. 4 illustrates a flow chart for a method for personalizing a user interface display in real-time, according to an embodiment.

Figure 1:
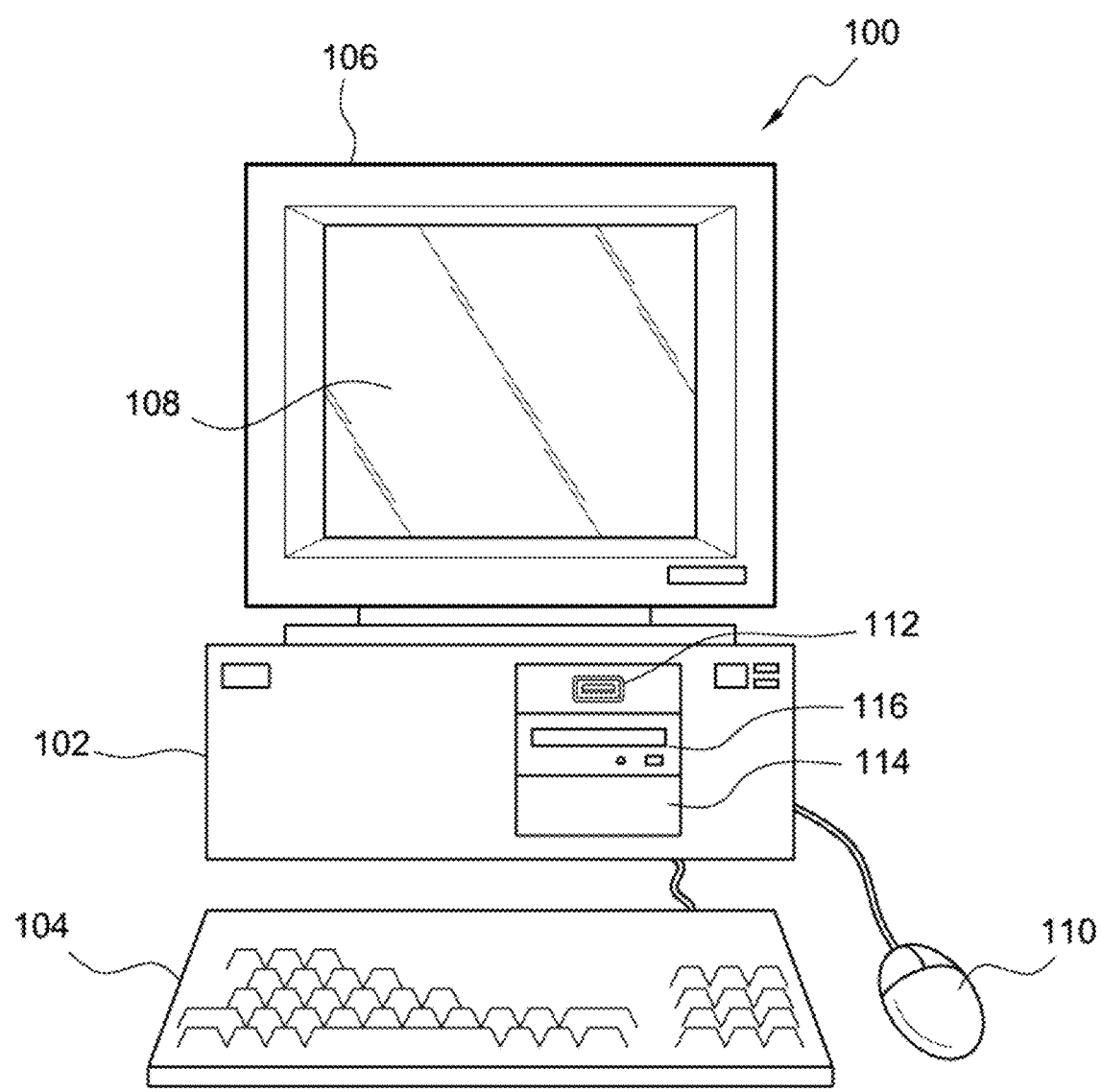
FIG. 1 illustrates a front elevation view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately 0.1 second, 0.5 second, one second, two seconds, five seconds, or ten seconds.

DESCRIPTION OF EXAMPLES OF EMBODIMENTS

Figure 2:
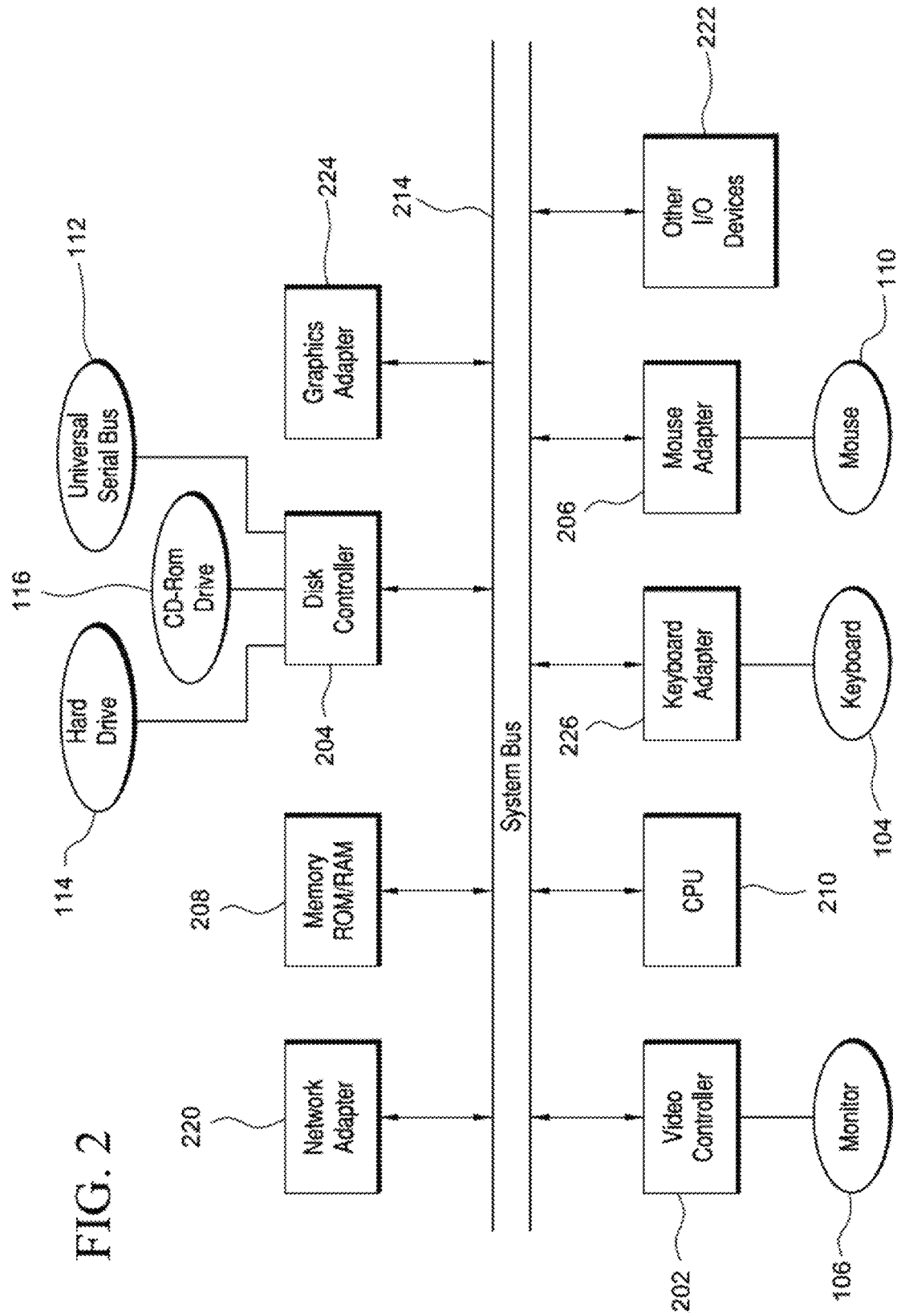
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. (Microsoft) of Redmond, Washington, United States of America, (ii) Mac® OS X by Apple Inc. (Apple) of Cupertino, California, United States of America, (iii) UNIX® OS, and (iv) Linux® OS. Further exemplary operating systems can comprise one of the following: (i) the iOS® operating system by Apple, (ii) the Blackberry® operating system by Research In Motion (RIM) of Waterloo, Ontario, Canada, (iii) the WebOS operating system by LG Electronics (LG) of Seoul, South Korea, (iv) the Android™ operating system developed by Google, Inc. (Google) of Mountain View, California, United States of America, or (v) the Windows Mobile™ operating system by Microsoft.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computer system 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
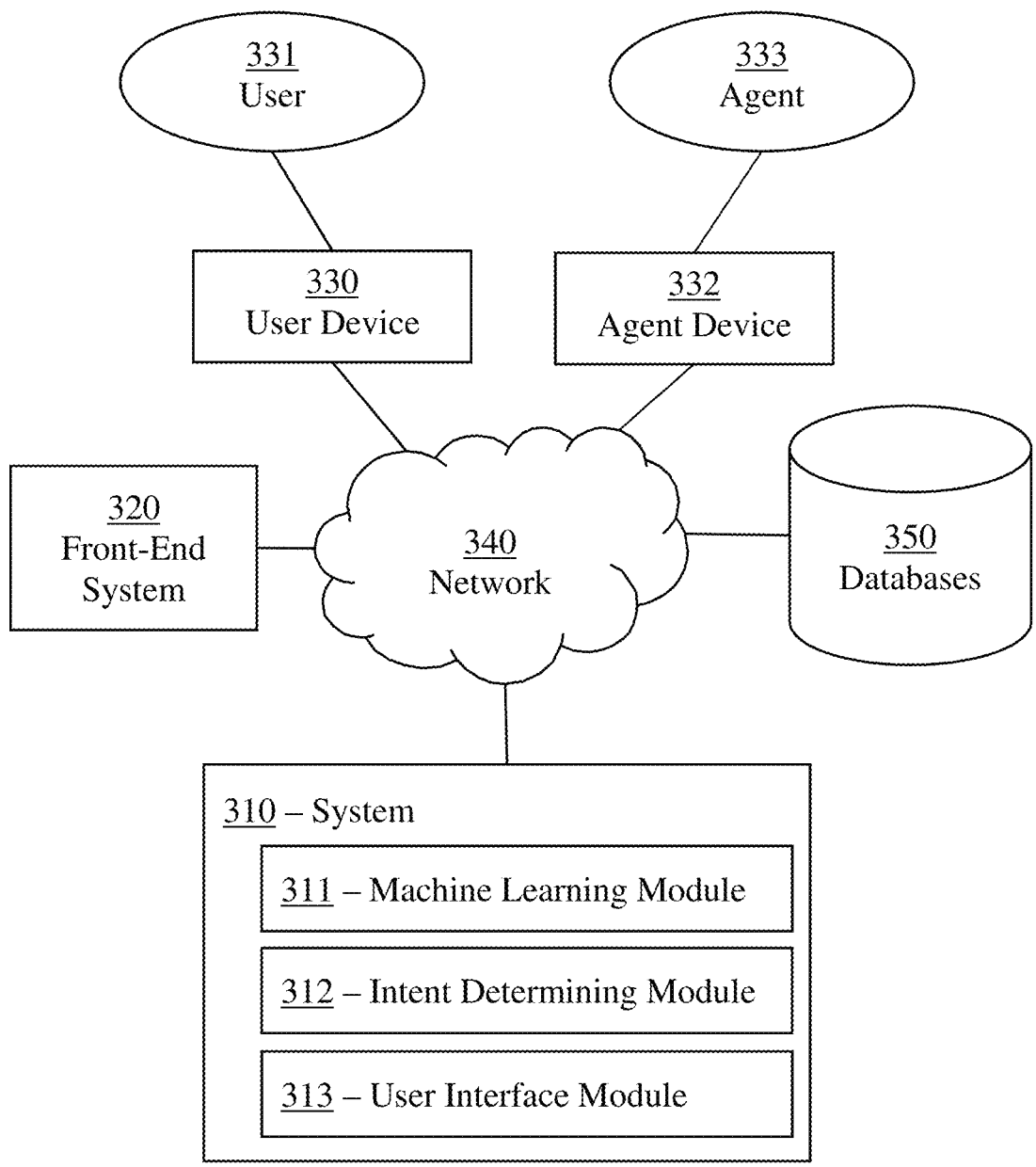
FIG. 3 illustrates a block diagram of a system that can be employed for personalizing a user interface display in real-time, according to an embodiment.

Turning ahead in the drawings, FIG. 3 illustrates a block diagram of a system 300 that can be employed for personalizing a user interface displays in real-time, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include one or more systems (e.g., system 310 and/or front-end system 320), one or more user devices (e.g., user device 330) for one or more users (e.g., user 331), and/or one or more agent devices (e.g., agent device 332) for one or more agents (e.g., agent 333). In a few embodiments, system 310 can include front-end system 320. In the same or different embodiments, system 310 can include machine learning module 311, intent determining module 312, and/or user interface module 313. System 310 (and each of its modules), front-end system 320, user device 330, and/or agent device 332 can each be a computer system, such as computer system 100 (FIG. 1), as described above, and can each be a single computer, a single server, or a cluster or collection of computers or servers, or a cloud of computers or servers. In another embodiment, a single computer system can host each of system 310 (and/or each of its modules), front-end system 320, user device 330, and/or agent device 332.

In many embodiments, system 310 and/or each of its modules can be modules of computing instructions (e.g., software modules) stored at non-transitory computer readable media that operate on one or more processors. In other embodiments, system 310 and/or each of its modules can be implemented in hardware or combination of hardware and software. In many embodiments, system 310 and/or each of its modules can comprise one or more systems, subsystems, servers, modules, or models. Additional details regarding system 310 (and/or each of its modules), front-end system 320, user device 330, and/or agent device 332 are described herein. In other embodiments, system 310 can be implemented in hardware. In many embodiments, system 310 can comprise one or more systems, subsystems, servers, modules, or models. Additional details regarding system 310, machine learning module 311, intent determining module 312, user interface module 313, front-end system 320, user device 330, and/or agent device 332 are further described below.

In some embodiments, system 310 can be in data communication, through network 340 (e.g., a computer network, a telephone network, or the Internet, etc.), with front-end system 320, user device 330, and/or agent device 332. In some embodiments, user device 330 can be used by a user, such as user 331. In a number of embodiments, front-end system 320 can host one or more websites and/or mobile application servers. For example, front-end system 320 can host a website, an interactive voice response (IVR) system, and/or a chat system, or provide a server that interfaces with an application (e.g., a mobile application, a web browser, or a chat application), on user device 330, which allows user 331 to report or inquire regarding issues about orders, returns, or refunds and/or to interact with system 310, a customer care system, or agent 333 via agent device 332.

In some embodiments, an internal network (e.g., network 340) that is not open to the public can be used for communications between system 310 with front-end system 320, user device 330, and/or agent device 332. In these or other embodiments, the operator and/or administrator of system 310 can manage system 310, the processor(s) of system 310, and/or the memory storage unit(s) of system 310 using the input device(s) and/or display device(s) of system 310.

In certain embodiments, the user devices (e.g., user device 330) and/or agent devices (e.g., agent device 332) can be desktop computers, laptop computers, mobile devices, and/or other endpoint devices used by one or more users (e.g., user 331) and/or agents (e.g., agent 333). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Android™ operating system developed by the Open Handset Alliance, or (iv) the Windows Mobile™ operating system by Microsoft Corp. of Redmond, Washington, United States of America.

In many embodiments, system 310 can include one or more input devices (e.g., one or more keyboards, one or more keypads, one or more pointing devices such as a computer mouse or computer mice, one or more touchscreen displays, a microphone, etc.), and/or can comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to system 310 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of system 310. In a similar manner, the processors and/or the non-transitory computer-readable media can be local and/or remote to each other.

Meanwhile, in many embodiments, system 310 also can be configured to communicate with one or more databases (e.g., databases 350). The one or more databases can include a transaction database, an interaction database, a chat & incident database, and so forth. The transaction database can include information about one or more transactions occurred for user 331. The interaction database can include information about one or more interactions between user 331 and front-end system 320. The chat & incident database can include information about one or more incidents and/or chats between user 331 and agent 333 or an automated customer service system.

In some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units. Further, the one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, RocksDB, and IBM DB2 Database.

Meanwhile, system 300, system 310, and/or databases 350 can be implemented using any suitable manner of wired and/or wireless communication. Accordingly, system 300 and/or system 310 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, system 310 can receive, via network 340, a user interaction signal from a user device (e.g., user device 330) for a user (e.g., user 331). Examples of the user interaction signal can include loading a landing page or any webpages of a customer care website, a phone call going through to an IVR system, or an initiation of a chat with a chat system hosted by front-end system 320.

In a number of embodiments, after receiving the user interaction signal, system 310 and/or intent determining module 312 further can determine, in real-time via a machine learning model (e.g., machine learning module 311), a plurality of user intent labels based at least in part on transaction data, interaction data, and incident data for the user (e.g., user 331). The machine learning model can be pre-trained, by system 310 or any other systems, based on historical input data and historical output data associated with multiple users including the user.

In some embodiments, the historical input data can include historical feature embedding vectors for historical transaction data, historical interaction data, and historical incident data associated with the multiple users. In a number of embodiments, the historical feature embedding vectors can be further generated based on the historical conversation data associated with the multiple users (e.g., recorded interactions via agents, the chat system, or the IVR system, etc.). The historical output data can include historical intent labels determined based at least in part on user-uttered intents by the multiple users in historical conversation data, identified by natural language processing (NLP).

Historical transaction data can include information about historical transactions associated with the multiple users, such as order status (e.g., order shipped/delivered—on time or delay, order cancelled, etc.) and time since a user's last order, and so forth. Historical interaction data can include information about historical interactions associated with the multiple users, such as the URLs a user visited, titles of articles or webpages visited, search queries, order history views, etc. Historical incident data can include information about historical incidents created when users reached out to customer care team, such as the purposes of such incidents, including "Where is my order," "Where is my return," "Return," "Why did Walmart cancel my order," "Cancel/Modify my order," etc.

In some embodiments, the historical intent labels further can be determined based at least in part on historical intent categories or labels provided by agents for the historical incident data. In a number of embodiments, the machine learning model (e.g., machine learning module 311) further can be pre-trained to determine, by natural language understanding, the user-uttered intents by the multiple users in the historical conversation data based on any suitable algorithms, such as a neural network algorithm, Bayesian networks, support vector machines, etc.

In many embodiments, the machine learning model (e.g., machine learning module 311) can be pre-trained to determine the plurality of user intent labels by any suitable machine learning algorithms, such as a classification algorithm. The machine learning model can be pre-trained to further determine a respective confidence score for each of the plurality of user intent labels. In some embodiments, determining the one or more user intent candidates further can include determining the one or more user intent candidates based on a candidate count threshold.

In a number of embodiments, system 310 can train the machine learning model (e.g., machine learning module 311) by estimating internal parameters and/or using labeled training data, otherwise known as a training dataset. In some embodiments, the training dataset for the machine learning model can be associated with all or a part of historical transaction data, historical interaction data, historical incident data, and/or historical conversation data. For instance, the historical transaction data used in the training dataset for training the machine learning model (e.g., machine learning module 311) can be limited to data about historical transactions associated with users in a geographic area (e.g., a country or a continent, etc.).

In various embodiments, the machine learning model (e.g., machine learning module 311) can be pre-trained, or re-trained, based on the training dataset. In some embodiments, the machine learning model can also consider both historical and dynamic input from system 310. In this way, the machine learning model can be trained iteratively as data from system 310 is added to the corresponding training dataset. In many embodiments, the machine learning model can be iteratively trained in real time as data is added to the corresponding training dataset.

Further, in some embodiments, the transaction data can be associated with one or more transactions occurred for the user (e.g., user 331) within a transaction time window (e.g., 30 days, 60 days, 90 days, 100 days, etc.). The interaction data for the user can be associated with one or more interactions occurred within an interaction time window (e.g., 15 days, 30 days, 45 days, 60 days, etc.). The incident data for the user can be associated with one or more incidents handled by agents and/or an automated customer service system within an incident time window (e.g., 3 days, 7 days, 10 days, 15 days, etc.).

In some embodiments, after determining the plurality of user intent labels, system 310 further can determine, in real-time, one or more user intent candidates of the plurality of user intent labels based on a confidence threshold (e.g., 70%, 80%, 85%, etc.). In several embodiments, after determining the one or more user intent candidates by intent determining module 312, system 310 and/or user interface module 313 also can determine, in real-time, one or more user interface components for the one or more user intent candidates. Examples of the one or more user interface components can include one or more audio and/or visual contents, audio menu commands, or graphical user interface controls with respective predetermined texts, visual and/or audio elements, and/or associated values (e.g., an URL). For example, when system 310 determines that the one or more user intent candidates include "Where is my return," "Return," and "Refund," the one or more action items for a chat application on a mobile device (e.g., user device 330) can include user interface controls (e.g., buttons) for "Where is my return?", "Where is my refund?", and "Return FAQ."

In many embodiments, after determining the one or more user interface components, system 310 and/or user interface module 313 can transmit, via network 340, the one or more user interface components to be presented on a user interface executed on the user device (e.g., user device 330) for the user (e.g., user 331). In a number of embodiments, system 310 can substitute the one or more user interface components for one or more default user interface components on the user interface before transmitting the one or more user interface components to the user device. In certain embodiments, system 310 and/or user interface module 313 can transmit a new display on the user interface with the one or more user interface components to replace the old display on the user interface. In many embodiments, system 310 and/or intent determining module 312 can predict user intent and determine the one or more action items before the user provides the intent. For example, system 310 and/or user interface module 313 can personalize the landing page of a website for the user or the first IVR menu which the IVR system greets the user with. In some embodiments, if no user intent candidates exist, system 310 and/or user interface module 313 can transmit a default user interface to the user device.

Conventional systems are unable to correctly predict user intent to personalize user interface displays in real-time because they rely on labels identified by agents, which are subject to human errors and thus can be incomplete and sometimes incorrect. In many embodiments, intent determining techniques provided by system 300, system 310, and/or intent determining module 312 can advantageously address the problem by training the machine learning model (e.g., machine learning module 311) based on historical and dynamic input and output data, including the conversation data and the respective intents uttered by the users, and predict user intent more accurately.

Turning ahead in the drawings, FIG. 4 illustrates a flow chart for a method 400 of personalizing a user interface display in real-time, according to an embodiment. In many embodiments, method 400 can be implemented via execution of computing instructions on one or more processors for personalizing a user interface display in real-time. Method 400 is merely exemplary and is not limited to the embodiments presented herein. Method 400 can be employed in many different embodiments or examples not specifically depicted or described herein. In some embodiments, the procedures, the processes, the activities, and/or the blocks of method 400 can be performed in the order presented. In other embodiments, the procedures, the processes, the activities, and/or the blocks of method 400 can be performed in any suitable order. In still other embodiments, one or more of the procedures, the processes, the activities, and/or the blocks of method 400 can be combined or skipped.

In many embodiments, system 300 (FIG. 3) and/or system 310 (FIG. 3) (including the modules) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of a computer system such as system 300 (FIG. 3) and/or system 310 (FIG. 3) (including the modules). The processor(s) can be similar or identical to the processor(s) described above with respect to computer system 100 (FIG. 1).

In many embodiments, method 400 can be performed by a computer server, such as system 300 (FIG. 3) and/or system 310 (FIG. 3), to receive, via a computer network (e.g., network 340 (FIG. 3)), a user interaction signal from a user device (e.g., user device 330 (FIG. 3)) for a user (e.g., user 331 (FIG. 3)) (block 410).

In many embodiments, method 400 further can include, after receiving the user interaction signal, determining, in real-time via a machine learning model (e.g., machine learning module 311 (FIG. 3)), a plurality of user intent labels based at least in part on transaction data, interaction data, and incident data for the user (block 420), based on a training dataset for the machine learning model. The machine learning model can be pre-trained based on historical input data and historical output data associated with multiple users, including or not including the user. The historical input data can include historical feature embedding vectors for historical transaction data, historical interaction data, and historical incident data associated with the multiple users. In some embodiments, the historical feature embedding vectors further can be generated based on historical conversation data associated with the multiple users. The historical output data can include historical intent labels determined based at least in part on user-uttered intents by the multiple users in the historical conversation data, identified by natural language understanding.

In some embodiments, the historical feature embedding vectors further can be generated based on the historical conversation data associated with the multiple users. The transaction data can be associated with one or more transactions occurred for the user within a transaction time window. The interaction data for the user can be associated with one or more interactions occurred within an interaction time window. The incident data for the user can be associated with one or more incidents handled by agents within an incident time window.

In a number of embodiments, the historical intent labels can be further determined based at least in part on historical intent categories (e.g., refund, return, order tracking, etc.) provided by agents (e.g., agents 333 (FIG. 3)) for the historical incident data. In several embodiments, the machine learning model (e.g., machine learning module 311 (FIG. 3)) further can be pre-trained to determine, by natural language understanding, the user-uttered intents by the multiple users in the historical conversation data based on any suitable artificial and/or machine learning algorithms, such as a neural network algorithm, Bayesian networks, support vector machines, etc. In some embodiments, the machine learning model (e.g., machine learning module 311 (FIG. 3)) further can be pre-trained to determine the plurality of user intent labels by any suitable artificial and/or machine learning algorithms, such as a classification algorithm.

In many embodiments, method 400 further can include, after determining the plurality of user intent labels, determining, in real-time, one or more user intent candidates of the plurality of user intent labels based on a confidence threshold (block 430). In several embodiments, the machine learning model (e.g., machine learning module 311 (FIG. 3)) can be pre-trained to further determine a respective confidence score for each of the plurality of user intent labels. In similar or different embodiments, determining the one or more user intent candidates in block 430 further can include determining the one or more user intent candidates based on a candidate count threshold (e.g., 3, 5, etc.).

In some embodiments, method 400 further can include, after determining the one or more user intent candidates, determining, in real-time, one or more user interface components for the one or more user intent candidates (block 440).

In a number of embodiments, method 400 further can include, after determining the one or more user interface components, transmitting, via the computer network, the one or more user interface components to be presented on a user interface executed on the user device for the user (block 450).

Various embodiments can include a system for determining user intent and personalizing a user interface display accordingly in real-time. The system can include one or more processors and one or more non-transitory computer-readable media storing computing instructions that, when executed on the one or more processors, cause the one or more processors to perform various acts.

In a number of embodiments, the acts can include receiving, via a computer network, a user interaction signal from a user device for a user. In some embodiments, the acts further can include, after receiving the user interaction signal, determining, in real-time via a machine learning model, a plurality of user intent labels based at least in part on transaction data, interaction data, and incident data for the user. The machine learning model can be pre-trained based on historical input data and historical output data associated with multiple users comprising the user. The historical input data can include historical feature embedding vectors for historical transaction data, historical interaction data, and historical incident data associated with the multiple users. The historical output data can comprise historical intent labels determined based at least in part on user-uttered intents by the multiple users in historical conversation data, identified by natural language understanding.

In some embodiments, the acts further can include, after determining the plurality of user intent labels, determining, in real-time, one or more user intent candidates of the plurality of user intent labels based on a confidence threshold. In certain embodiments, the acts additionally can include, after determining the one or more user intent candidates, determining, in real-time, one or more user interface components for the one or more user intent candidates. In many embodiments, the acts further can include, after determining the one or more user interface components, transmitting, via the computer network, the one or more user interface components to be presented on a user interface executed on the user device for the user.

Further, various embodiments can include a method being implemented via execution of computing instructions configured to run at one or more processors and stored at one or more non-transitory computer-readable media. The method can include receiving, via a computer network, a user interaction signal from a user device for a user. The method further can include after receiving the user interaction signal, determining, in real-time via a machine learning model, a plurality of user intent labels based at least in part on transaction data, interaction data, and incident data for the user. The machine learning model can include pre-trained based on historical input data and historical output data associated with multiple users comprising the user. The historical input data can comprise historical feature embedding vectors for historical transaction data, historical interaction data, and historical incident data associated with the multiple users. The historical output data can include historical intent labels determined based at least in part on user-uttered intents by the multiple users in historical conversation data, identified by natural language understanding.

In some embodiments, the method also can include, after determining the plurality of user intent labels, determining, in real-time, one or more user intent candidates of the plurality of user intent labels based on a confidence threshold. In a few embodiments, the method further can include, after determining the one or more user intent candidates, determining, in real-time, one or more user interface components for the one or more user intent candidates. After determining the one or more user interface components, the method further can include transmitting, via the computer network, the one or more user interface components to be presented on a user interface executed on the user device for the user.

The foregoing is provided for purposes of illustrating, explaining, and describing embodiments of these disclosures. Modifications and adaptations to these embodiments will be apparent to those skilled in the art and may be made without departing from the scope or spirit of these disclosures.

Although personalizing a user interface display in real-time has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-4 may be modified, and that the foregoing discussion of certain of these embodiments does not necessarily represent a complete description of all possible embodiments. Different functions, artificial intelligence algorithms, and/or machine learning algorithms may be used to determine user intent. Various training datasets can be used for training the machine learning model described above.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions that, when executed on the one or more processors, cause the one or more processors to perform:
receiving, via a computer network, a user interaction signal from a user device for a user;
after receiving the user interaction signal, determining, in real-time via a machine learning model, a plurality of user intent labels based at least in part on transaction data, interaction data, and incident data for the user, wherein:
the machine learning model is pre-trained based on historical input data and historical output data associated with multiple users comprising the user;
the historical input data comprises historical feature embedding vectors for historical transaction data, historical interaction data, and historical incident data associated with the multiple users; and
the historical output data comprise historical intent labels determined based at least in part on user-uttered intents by the multiple users in historical conversation data, identified by natural language understanding;
after determining the plurality of user intent labels, determining, in real-time, one or more user intent candidates of the plurality of user intent labels based on a confidence threshold;
after determining the one or more user intent candidates, determining, in real-time, one or more user interface components for the one or more user intent candidates; and
after determining the one or more user interface components, transmitting, via the computer network, the one or more user interface components to be presented on a user interface executed on the user device for the user.

2. The system in claim 1, wherein:
the transaction data is associated with one or more transactions occurred for the user within a transaction time window.

3. The system in claim 1, wherein:
the interaction data for the user is associated with one or more interactions occurred within an interaction time window.

4. The system in claim 1, wherein:
the incident data for the user is associated with one or more incidents handled by agents within an incident time window.

5. The system in claim 1, wherein:
the historical feature embedding vectors are further generated based on the historical conversation data associated with the multiple users.

6. The system in claim 1, wherein:
the historical intent labels are further determined based at least in part on historical intent categories provided by agents for the historical incident data.

7. The system in claim 1, wherein:
the machine learning model is further pre-trained to determine, by natural language understanding, the user-uttered intents by the multiple users in the historical conversation data.

8. The system in claim 1, wherein:
the machine learning model is pre-trained to determine the plurality of user intent labels by a classification algorithm.

9. The system in claim 8, wherein:
the machine learning model is pre-trained to further determine a respective confidence score for each of the plurality of user intent labels.

10. The system in claim 1, wherein:
determining the one or more user intent candidates further comprises determining the one or more user intent candidates based on a candidate count threshold.

11. A method being implemented via execution of computing instructions configured to run at one or more processors and stored at one or more non-transitory computer-readable media, the method comprising:
receiving, via a computer network, a user interaction signal from a user device for a user;
after receiving the user interaction signal, determining, in real-time via a machine learning model, a plurality of user intent labels based at least in part on transaction data, interaction data, and incident data for the user, wherein:
the machine learning model is pre-trained based on historical input data and historical output data associated with multiple users comprising the user;
the historical input data comprises historical feature embedding vectors for historical transaction data, historical interaction data, and historical incident data associated with the multiple users; and
the historical output data comprise historical intent labels determined based at least in part on user-uttered intents by the multiple users in historical conversation data, identified by natural language understanding;
after determining the plurality of user intent labels, determining, in real-time, one or more user intent candidates of the plurality of user intent labels based on a confidence threshold;
after determining the one or more user intent candidates, determining, in real-time, one or more user interface components for the one or more user intent candidates; and
after determining the one or more user interface components, transmitting, via the computer network, the one or more user interface components to be presented on a user interface executed on the user device for the user.

12. The method in claim 11, wherein:
the transaction data is associated with one or more transactions occurred for the user within a transaction time window.

13. The method in claim 11, wherein:
the interaction data for the user is associated with one or more interactions occurred within an interaction time window.

14. The method in claim 11, wherein:
the incident data for the user is associated with one or more incidents handled by agents within an incident time window.

15. The method in claim 11, wherein:
the historical feature embedding vectors are further generated based on the historical conversation data associated with the multiple users.

16. The method in claim 11, wherein:
the historical intent labels are further determined based at least in part on historical intent categories provided by agents for the historical incident data.

17. The method in claim 11, wherein:
the machine learning model is further pre-trained to determine, by natural language understanding, the user-uttered intents by the multiple users in the historical conversation data.

18. The method in claim 11, wherein:
the machine learning model is pre-trained to determine the plurality of user intent labels by a classification algorithm.

19. The method in claim 18, wherein:
the machine learning model is pre-trained to further determine a respective confidence score for each of the plurality of user intent labels.

20. The method in claim 11, wherein:
determining the one or more user intent candidates further comprises determining the one or more user intent candidates based on a candidate count threshold.

* * * * *